United States Patent Office 2,908,728
Patented Oct. 13, 1959

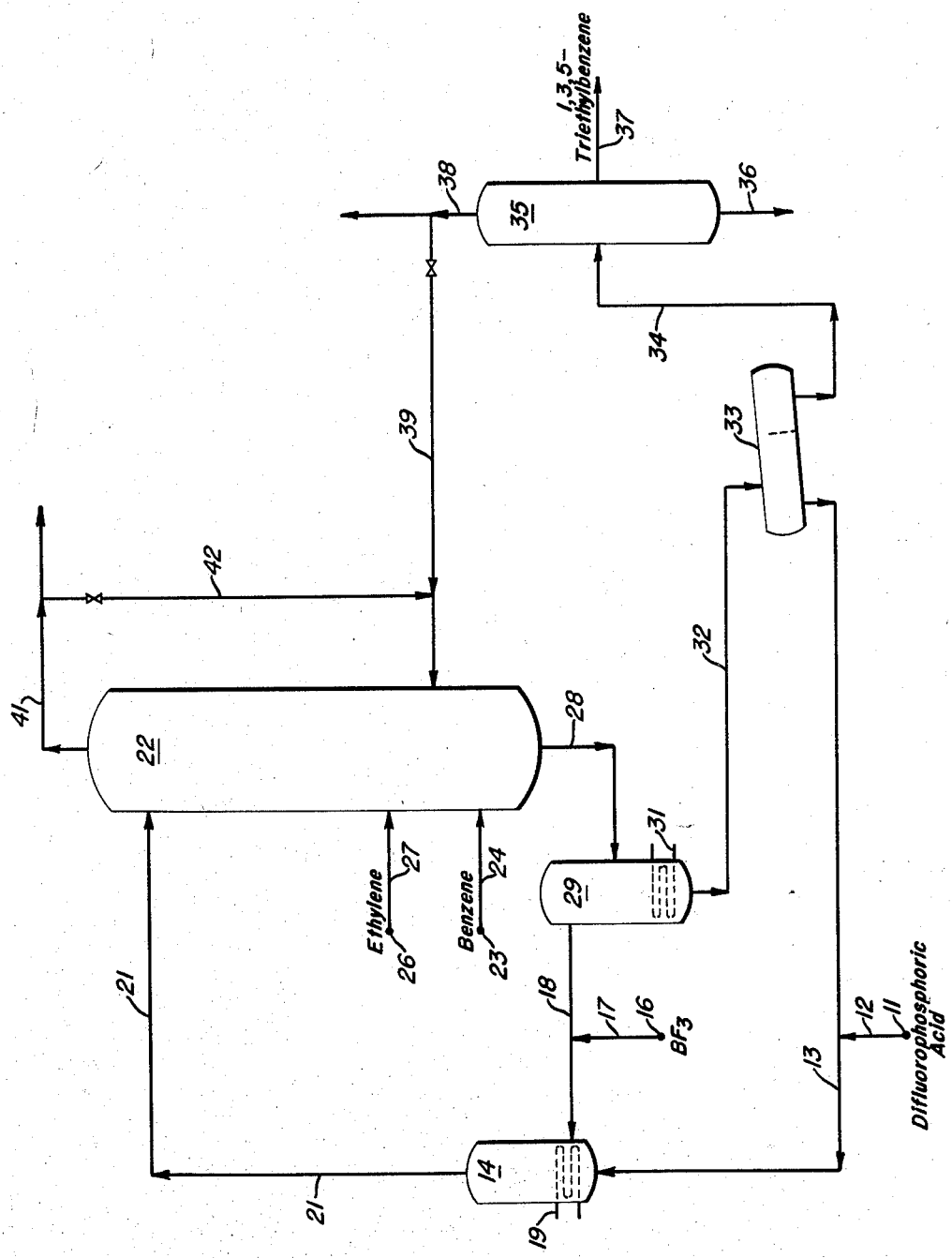

2,908,728

PRODUCTION OF TRIALKYLBENZENES IN THE PRESENCE OF A DIFLUOROPHOSPHORIC ACID-$BF_3$ CATALYST

John I. Slaughter, Beaver Dams, N.Y., and David A. McCaulay, Chicago, Ill., assignors to Standard Oil Company, Chicago, Ill., a corporation of Indiana Application December 22, 1955, Serial No. 554,775

9 Claims. (Cl. 260—671)

This invention relates to a process for the production of trialkylbenzenes, and more particularly it concerns the production of trialkylbenzenes which contain their alkyl substituents in the 1,3, and 5 positions in the benzene ring.

Polyalkylbenzenes are highly useful as intermediates in the manufacture of plastics. For instance, 1,3,5-triethylbenzene, which is substantially free of isomers containing ortho-positioned groups, can be dehydrogenated to the corresponding styrene and used in the production of high softening point resins having cross-linkages.

An object of this invention is to provide a process for producing 1,3,5-trialkylbenzenes. Another object is to provide a process for reacting benzene with olefins having from 2 to 4 carbon atoms, inclusive, in the molecule. A particular object is to provide a method and means for producing 1,3,5-triethylbenzene which is substantially free of other isomeric triethylbenzenes. Other objects of the invention will become apparent from the detailed description thereof.

It has been found that benzene can be reacted with an olefin having between 2 and 4 carbon atoms, inclusive, in the olefin molecule to produce trialkylbenzenes which have the alkyl substituents in the 1,3, and 5 positions in the benzene nucleus. The 1,3,5-trialkylbenzenes can be produced in a substantially pure form i.e. containing very little, e.g. 2% or less of its position isomers. The process is carried out by contacting the reactants in the presence of at least one volume of difluorophosphoric acid per volume of aromatic hydrocarbon and in the presence of a $BF_3$ partial pressure of between about 100 and 5000 p.s.i.g. A reaction temperature of between about $-100°$ F. and $300°$ F. is used. Surprisingly, it has been found that if $BF_3$ is employed in the reaction zone in a partial pressure less than atmospheric, no trialkylbenzenes are produced whatsoever and large amounts of tetra- and penta-alkyl benzene are produced. This is in marked contrast with the course of the reaction which occurs when $BF_3$ partial pressures of 100 p.s.i.g. and higher are maintained in the reaction zone, for under the latter conditions large amounts of 1,3,5-trialkylbenzenes and substantially no tetra- and penta-alkylbenzenes are produced. After the reaction has been effected, the 1,3,5-trialkylbenzenes can be recovered by removing $BF_3$ from contact with the hydrocarbons and acid and separating the acid phase from the hydrocarbon phase. The 1,3,5-trialkylbenzene can then be recovered in substantially pure form from the hydrocarbon phase by fractionation.

Because our catalyst system has selective solvent properties for 1,3,5-trialkylbenzenes, a preferred embodiment of our invention consists in separating a raffinate phase from an extract phase after the reaction has been effected. $BF_3$ is removed from the separated extract phase which causes the extracted hydrocarbons, principally 1,3,5-trialkylbenzenes and more highly alkylated benzenes, to be sprung from solution and form a separate hydrocarbon phase. This latter hydrocarbon phase will be richer in 1,3,5-trialkylbenzenes than if no separation had been made between the extract and raffinate phases. The 1,3,5-trialkylbenzenes may then be recovered by fractionation of the sprung hydrocarbon phase.

In our process for producing 1,3,5-trialkylbenzenes, benzene is reacted with an olefin. The olefin which may be used is one having between 2 and 4 carbon atoms, inclusive, in its molecule. Examples of such olefins are ethylene, propylene, butylenes, and isobutylene. While the invention is described in connection with the use of benzene, other aromatics such as toluene, xylenes, mono- and diethylbenzene as well as other mono-nuclear aromatic hydrocarbons which contain 2 or less alkyl substituents containing not more than 4 carbon atoms in the alkyl substituent, may be employed.

The benzene and olefin are contacted in the presence of at least one volume of difluorophosphoric acid per volume of benzene, generally not more than about ten volumes of difluorophosphoric acid per volume of benzene and in the presence of a $BF_3$ partial pressure of between about 100 and 5000 p.s.i.g. The volumetric ratio of difluorophosphoric acid to the aromatics fed to the reaction zone is generally not more than about 10:1. Usually about three volumes of difluorophosphoric acid per volume of aromatic hydrocarbon in the reaction zone will be a satisfactory ratio to use. When less than about one volume of difluorophosphoric acid is employed per volume of aromatic in the reaction zone, the alkylation reaction proceeds only to a very small degree.

In order to obtain a substantial production of 1,3,5-trialkylbenzenes it is essential that a $BF_3$ partial pressure of at least about 100 p.s.i.g. be maintained in the reaction zone during the course of the reaction. If the $BF_3$ is employed in a partial pressure of atmospheric or less, there is essentially no production of 1,3,5-trialkylbenzenes and in addition a substantial quantity of tetra- and penta-alkylbenzenes are produced. While $BF_3$ partial pressures of 5000 p.s.i.g. may be used, it is usually not economical to employ higher $BF_3$ partial pressures because of the great increase in equipment costs. It is preferred to employ $BF_3$ partial pressures of between about 500 and 2000 p.s.i.g., for example about 1000 p.s.i.g. is satisfactory.

The temperature which is employed in carrying out the reaction may be between about $-100°$ F. and $300°$ F. The operating temperature varies dependent upon the olefin which is employed in the reaction. In general the higher temperatures are employed with lower molecular weight olefins and the lower temperatures are employed with the higher molecular weight olefins. When ethylene is employed as the alkylating olefin a temperature of between $0°$ and $300°$ F., preferably between about $30°$ and $200°$ F., may be used. When propylene is employed the reaction temperature may be between $-25°$ to $150°$ F. When isobutylene is used in the alkylation, temperatures of between $-100°$ and $75°$ F. or thereabouts can be used.

The reaction of the aromatic with the olefin may be carried out at widely varied reaction or contact times. This time may be as short as 1 minute or as long as 25 hours. The better the mixing of the reactants and catalyst in the reaction zone, the shorter is the contact time which will be needed. Generally, the reaction proceeds more rapidly at the higher operating temperature and therefore longer contact times may be used when lower operating temperatures are employed. Usually, a contact time of between about ten minutes and five hours, for example thirty minutes, will be satisfactory. Other factors which have a bearing upon the operating temperature and contact time used are the volumetric ratio of difluorophosphoric acid to aromatic feed and the $BF_3$ partial pressure in the reaction zone. If the volumetric ratio of difluorophosphoric acid to feed aromatics is increased above 1.0, the contact time required may be decreased and/or the operating temperature may be decreased. Similarly if the partial pressure of $BF_3$ in the reaction zone is increased above 100 p.s.i.g., the operating temperature and/or contact time and/or volumetric ratio of difluorophosphoric acid to feed aromatic may be decreased, provided of course, that the reaction conditions remain within the ranges specified.

The reaction is preferably carried out by introducing the olefin into a reaction zone which contains the aromatic hydrocarbon, difluorophosphoric acid, and $BF_3$. The olefin should be introduced slowly so that no large excess of olefin will build up in the reaction zone and form undesirably large amounts of olefin-polymer. Thus the olefin is preferably introduced into the reaction zone over the course of the reaction period. This may be done by continuous introduction of the olefin in preference to intermittent introduction of the olefin. In producing 1,3,5-trialkylbenzene from benzene and an olefin, approximately 3 moles of olefin are introduced per mole of benzene. Obviously if a portion of mono-alkylbenzene or dialkylbenzene is recycled to the reaction zone, less olefin is required in producing the 1,3,5-trialkylbenzene.

Our catalyst system has selective solvent properties. It is believed that it functions as a selective solvent because of certain complex formations which will be hereinafter described. $BF_3$ is readily absorbed when passed into difluorophosphoric acid. When exposed to a partial pressure of $BF_3$ of 5 p.s.i.g. or higher, the acid becomes saturated with $BF_3$. A coordination compound appears to form between two moles of difluorophosphoric acid and one mole of $BF_3$. If additional $BF_3$ is present (a contact zone is operated under a partial pressure of $BF_3$ of e.g. 100 p.s.i.g. or higher) the polyalkylbenzenes, especially those containing alkyl substituents substituted in the 1,3,5 positions in the benzene ring, become complexed with the difluorophosphoric acid and $BF_3$. Thus the coordination compound consisting of two moles of difluorophosphoric acid with one mole of $BF_3$ appears to complex with one mole of an extractable polyalkylbenzene and an additional mole of $BF_3$ in the following fashion.

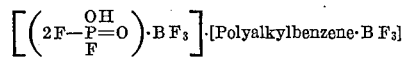

The complexes which are formed between the difluorophosphoric acid, $BF_3$, and various polyalkylbenzenes have varying degrees of stability dependent upon the polyalkylbenzene and the partial pressure of $BF_3$ on the system. In general polyalkylbenzenes form more stable complexes when they contain a greater number of alkyl substituents in the benzene ring. Those alkylbenzenes which are substituted in the 1,3 and 1,3,5 position form complexes which are more stable than those formed from polyalkylbenzenes having the same number of alkyl substituents but which are substituted in different positions in the benzene ring. The stability of the complex of a polyalkylbenzene with difluorophosphoric acid and $BF_3$ is reflected by the pressure at which it dissociates. The higher the $BF_3$ pressure necessary to prevent dissociation, the less stable is the complex. By taking advantage of the differing stabilities of the complexes of various polyalkylbenzenes with difluorophosphoric acid at varying $BF_3$ partial pressures, a number of separations between different polyalkylbenzenes can be effected.

After carrying out the reaction between the aromatic hydrocarbons and olefins for the desired length of time, the reaction products can then be recovered. The 1,3,5-trialkylbenzenes can be recovered by reducing the partial pressure of $BF_3$ which is in contact with all of the hydrocarbons and difluorophosphoric acid. As the $BF_3$ partial pressure is reduced, the less stable complexes formed between difluorophosphoric acid, $BF_3$, and the polyalkylbenzenes are dissociated. The polyalkylbenzenes are thus sprung from solution in the acid phase and pass into a hydrocarbon phase. Stratification of the hydrocarbon and acid phases can be effected and the two phases separated. The 1,3,5-trialkylbenzenes can then be recovered from the hydrocarbon phase by fractionation or other suitable means. It is apparent that the $BF_3$ partial pressure may be partially reduced and the quantity of sprung hydrocarbons regulated to achieve a separation or solvent extraction effect.

A preferred method of recovering the 1,3,5-trialkylbenzenes from the reaction product employs the selective solvent properties of our catalyst system. During the course of the reaction between the aromatics and olefins, a heterogeneous mixture of liquids, as well as a gas phase, is present in the reactor. The preferred method of recovering the 1,3,5-trialkylbenzenes consists of separating the two liquid phases which are present after the reaction of the aromatic hydrocarbons with the olefins. These two liquid phases will be termed herein as the raffinate phase (which contains $BF_3$ and non-complexed hydrocarbons) and the extract phase (which contains difluorophosphoric acid, $BF_3$, complexed and some physically dissolved hydrocarbons). The separation of the extract phase from the raffinate phase before removing any substantial amount of $BF_3$ from the extract phase provides a means for extracting the 1,3,5-trialkylbenzenes in the extract phase. The $BF_3$ partial pressure existent in the separated extract phase may then be partially or fully reduced e.g. reduced to atmospheric pressure. This springs a hydrocarbon phase having a very high concentration of 1,3,5-trialkylbenzenes. The 1,3,5-trialkylbenzenes can then be fractionated, if desired, from the hydrocarbon phase which has been sprung from the extract phase. A very high purity 1,3,5-trialkylbenzene fraction, substantially free of other trialkylbenzenes containing alkyl substituents in different positions in the benzene ring can thus be produced.

The invention will be more fully understood by reference to the following example illustrated in the annexed drawing which forms a part of this specification and shows in schematic form one embodiment of the process of this invention for producing 1,3,5-triethylbenzene from benzene and ethylene. Numerous valves, pumps, compressors, heating and cooling means, and the like have not been shown for the purpose of better clarity.

Difluorophosphoric acid from source 11 is passed by way of line 12 into line 13 where it meets with additional quantities of recovered and recycled difluorophosphoric acid. It is then passed by way of line 13 into vessel 14. $BF_3$ from source 16 is passed by way of line 17 into line 18 where it meets additional quantities of recovered $BF_3$. $BF_3$ is then passed by way of line 18 into vessel 14. The catalyst is prepared in vessel 14 by introducing $BF_3$ into difluorophosphoric acid until a partial pressure of $BF_3$ of about 1000 p.s.i.g. is attained. Vessel 14 is provided with cooling means 19 to remove the heat formed during saturation of the acid with $BF_3$.

The catalyst, which consists of difluorophosphoric acid maintained under a $BF_3$ partial pressure of about 1000 p.s.i.g. is passed from vessel 14 by way of line 21 into reactor 22 at a point near the top of the reactor. Benzene from source 23 is passed by way of line 24 into reactor 22 at a point near the bottom of the reactor. Ethylene from source 26 is passed by way of line 27 into reactor 22 at a point intermediate of the introduction of the catalyst and the benzene. The catalyst travels downwardly in reactor 22 and the hydrocarbons travel upwardly therethrough, except for the 1,3,5-trialkylbenzenes which are extracted by the selective solvent action of the catalyst. A temperature of about 75° F. is maintained within the reactor. The $BF_3$ pressure is maintained at about 1000 ps.i.g. by the addition of further amounts of $BF_3$ as may be needed. The catalyst and benzene are introduced at rates so that approximately 3 volumes of difluorophosphoric acid are introduced per volume of benzene introduced. A contact time of approximately 1 hour is employed. Ethylene is introduced continuously into the reaction zone over the course of the contact time in the amount of about 3 moles per mole of benzene introduced (when partly alkylated benzene is recycled, the molar ratio of ethylene to benzene may be reduced to account for such operation). While more or less the 3 moles of olefin per mole of benzene can be used, for example from 0.5 to 5 moles of olefin per mole of benzene may be employed, it is preferred to use approximately 3 moles of olefin per mole of benzene in order to maximize the 1,3,5-trialkylbenzene production. In reactor 22 which is well agitated by means not shown, benzene is alkylated with ethylene to produce a substantial amount of 1,3,5-triethylbenzene together with lesser amounts of ethylbenzene, diethylbenzene, and hexa-ethylbenzene.

A raffinate phase containing $BF_3$ and hydrocarbons, including benzene, ethylbenzene, and diethylbenzenes which are not dissolved by the extract phase, is removed from the top of reactor 22. The heavier extract phase which contains $BF_3$, difluorophosphoric acid, and complexed polyethylbenzenes is removed, while still subject to a partial pressure of $BF_3$ of about 1000 p.s.i.g., from the bottom of the reactor. To achieve a sharper separation during the extraction of the 1,3,5-triethylbenzene, paraffins or other inert hydrocarbons, which preferably boil outside the range of the reactants and the reaction products, may be introduced into reactor 22 wherein they scrub out physically dissolved but uncomplexed aromatics from the extract phase. When paraffins are so employed they may be introduced into reactor 22 at a point intermediate of the introduction of the reactants and the catalyst. The extract phase which is removed from the bottom of reactor 22 is then passed by way of line 28 into extract decomposer 29. $BF_3$ is flashed from the extract phase by reducing the pressure on the extract phase to atmospheric pressure. Extract decomposer 29 is provided with a heating means 31 which maintains a temperature within the decomposer of about 100° F. The flashed $BF_3$ is removed by way of line 18 and thence passed into vessel 19 for the preparation of further amounts of catalyst.

The liquid then remaining in vessel 29 is substantially all difluorophosphoric acid and 1,3,5-triethylbenzene together with hexa-ethylbenzene which may have been formed and minor amounts of mono- and diethylbenzenes and benzene. The liquid is passed from extract decomposer 29 by way of line 32 into settler 33 wherein a heavier difluorophosphoric acid layer is separated from a lighter layer of hydrocarbons. The difluorophosphoric acid layer is removed from settler 33 and passed by way of line 13 into vessel 14 where it is used to prepare additional quantities of catalyst. Upon continued reuse the difluorophosphoric acid may become contaminated with a tarry material. When the acid requires it, it may be purified by distillation at a temperature of about 175° F. under a slight vacuum. The purified acid may then be sent to vessel 14 and the tarry bottoms discarded. Referring to settler 33, the lighter hydrocarbon layer is removed therefrom and passed by way of line 34 into fractionator 35. Prior to fractionation it may be purified of remaining traces of acid and $BF_3$ by means such as caustic washing, water washing, and coalescing, or other means, not shown. In fractionator 35 a heavy bottoms fraction consisting of substantially all hexa-ethylbenzene is removed by way of line 36 and passed to storage means, not shown. A side stream which consists of substantially pure 1,3,5-triethylbenzene is removed by way of line 37 and sent to storage, not shown. A low boiling fraction is removed overhead from fractionator 35 by way of line 38. This fraction will consist primarily of diethylbenzenes as well as any ethylbenzene and benzene which might become physically occluded in the extract phase. The volume of this fraction is small by comparison with the volume of 1,3,5-triethylbenzene produced. It may be recycled if desired, by way of valved line 39 into reactor 22 for further alkylation to produce additional amounts of 1,3,5-triethylbenzene.

The raffinate phase is removed overhead from reactor 22 and passed by way of line 41 to means which are not shown herein for the recovery of $BF_3$ and hydrocarbons. Since the raffinate phase will consist of substantial amounts of $BF_3$, benzene, ethylbenzene, and diethylbenzene, and ethylene, it may be recycled completely or in part by way of valved line 42 and thence into valved line 39 by which it is returned to reactor 22. It is preferred, however, to remove the raffinate phase by way of line 41 and then recover the constituents by suitable means such as fractionation, after which the desirable constituents of the raffinate phase may be recycled to reactor 22.

Runs were performed which demonstrate the effectiveness of our invention of producing 1,3,5-trialkylbenzenes. The runs which were performed follow:

RUN NO. 1

Run No. 1 demonstrates that if $BF_3$ is not employed in a high partial pressure in the reaction zone, no 1,3,5-trialkylbenzenes are produced and instead substantial amounts of tetra- and penta-alkylbenzenes are formed. In this run the catalyst was prepared by introducing $BF_3$ into difluorophosphoric acid until the acid was saturated with $BF_3$ under atmospheric conditions. Approximately 0.5 mole of $BF_3$ are taken up per mole of difluorophosphoric acid. An autoclave reactor provided with internal agitation means was used in carrying out the reaction. The difluorophosphoric acid (saturated with $BF_3$) and benzene, in a volumetric ratio of difluorophosphoric acid to benzene of 2.4:1, were mixed in the reactor and ethylene was slowly added thereto. The ethylene was added in the amount of 3.1 moles per mole of benzene in the reaction zone. Ethylene was added slowly and continuously over the course of the reaction time which was 80 minutes. The reaction temperature was maintained at 75° F. At the conclusion of the reaction period the contents of the autoclave were passed into a vessel filled with crushed ice which had been brought to the temperature of a Dry Ice-acetone bath. The hydrocarbons separated as an upper oil layer above a lower aqueous acid layer. The oil layer was withdrawn, neutralized with aqueous ammonia, and water washed. The composition of the product in mole percent was then determined by fractionation and infra-red spectrometry. The feed benzene was converted to the extent of 92% to alkylated products. The composition of the products follows:

*Product distribution, mole percent*

| | Percent |
|---|---|
| Benzene | 8 |
| Ethylbenzene | 21 |
| 1,2-diethylbenzene | 9.4 |
| 1,3-diethylbenzene | 8.9 |
| 1,4-diethylbenzene | 9.8 |
| Triethylbenzenes | 0 |
| Tetra- and penta-ethylbenzenes | 18 |
| Hexa-ethylbenzene | 25 |

RUN NO. 2

This run was performed in a fashion similar to run No. 1 except that the reactor was pressured with $BF_3$ until a partial pressure of $BF_3$ of 500 p.s.i.g. was attained therein. After pressuring the reactor containing difluorophosphoric acid with $BF_3$, the benzene was added and thereafter the ethylene was introduced. The reaction time was 30 minutes instead of the 80 minutes employed in run 1. In run 2, 95% of the benzene feed was converted to alkylated products. The composition of the product was as follows:

*Product distribution, mole percent*

| | Percent |
|---|---|
| Benzene | 5 |
| Ethylbenzene | 27 |
| 1,2-diethylbenzene | 0 |
| 1,3-diethylbenzene | 5 |
| 1,4-diethylbenzene | 0 |
| 1,2,4-triethylbenzene | 0 |
| 1,3,5-triethylbenzene | 34 |
| Tetra- and penta-ethylbenzenes | 0 |
| Hexa-ethylbenzenes | 29 |

If the product distribution from run 2 is compared with that from run 1, it would be noted that 1,3,5-triethylbenzene was produced only in run 2. It will be further noticed that run 2 did not produce any tetra- or penta-ethylbenzene whereas they were produced in a substantial amount in run 1. It is evident that the use of an elevated $BF_3$ partial pressure in the reaction zone is essential in producing 1,3,5-trialkylbenzenes. Peculiarly, only a small amount of dialkylbenzene, which is exclusively 1,3-dialkylbenzene, is produced when the reaction is conducted under an elevated partial pressure of $BF_3$. Thus by the process of our invention it is possible to alkylate benzene with an olefin to produce a substantial amount of 1,3,5-trialkylbenzene and also hexa-alkylbenzene whereas if no elevated $BF_3$ partial pressure is employed in the reaction, there will be produced a spectrum of products containing mono-alkyl, dialkyl-, tetra-alkyl-, penta-alkyl and hexa-alkylbenzenes, but no trialkylbenzenes whatsoever. This application is a continuation-in-part of our S.N. 504,206, filed April 27, 1955, and issued as U.S. 2,762,751.

Although the present invention has been described with reference to specific preferred embodiments thereof, the invention is not to be considered as limited thereto but includes within its scope such modifications and variations as come within the spirit of the appended claims.

We claim:

1. A process for the production of 1,3,5-trialkylbenzenes which comprises reacting an olefin having between 2 and 4 carbon atoms, inclusive, in the olefin molecule with benzene in a reaction zone in the presence of at least one volume of difluorophosphoric acid per volume of benzene, said olefin being employed in an amount not greater than about 3 mols per mol of benzene, and in the presence of a $BF_3$ partial pressure of between about 100 and 5000 p.s.i.g. at a temperature between about $-100°$ F. and $300°$ F., removing $BF_3$ from contact with the hydrocarbons and acid, separating an acid phase from a hydrocarbon phase, and recovering 1,3,5-trialkylbenzenes from the hydrocarbon phase.

2. The process of claim 1 wherein the olefin is introduced into the reaction zone over the course of the reaction time.

3. The process of claim 1 wherein approximately three moles of olefin per mole of benzene are introduced into the reaction zone.

4. The process of claim 1 wherein the olefin is ethylene and wherein the reaction temperature is between about $30°$ and $200°$ F.

5. The process of claim 1 wherein a raffinate phase is separated from an extract phase prior to removing $BF_3$.

6. A process for the production of 1,3,5-trialkylbenzenes which comprises introducing an olefin having between 2 and 4 carbon atoms, inclusive, in the olefin molecule into a reaction zone containing benzene, difluorophosphoric acid, and $BF_3$; the difluorophosphoric acid being employed in the amount of between about 1 and 10 volumes per volume of benzene and the olefin being introduced in the amount of approximately three moles per mole of benzene; maintaining the reaction zone under a partial pressure of $BF_3$ of between about 100 and 5000 p.s.i.g. and at a temperature between about $30°$ F. and $200°$ F.; separating while under said partial pressure of $BF_3$, a raffinate phase from an extract phase, removing $BF_3$ from contact with the extract phase and thereby forming a hydrocarbon phase and an acid phase, and recovering 1,3,5-trialkylbenzenes from the hydrocarbon phase.

7. The process of claim 6 wherein the olefin is slowly and continuously introduced into the reaction zone over the course of the reaction time.

8. The process of claim 6 wherein the olefin is ethylene and a temperature of about $75°$ F. is maintained in the reaction zone.

9. The process of claim 6 wherein $BF_3$ is removed from contact with the extract phase by vaporization therefrom.

References Cited in the file of this patent

UNITED STATES PATENTS

| 2,192,015 | Nieuwland et al. | Feb. 27, 1940 |
| 2,469,335 | Johnson et al. | May 3, 1949 |
| 2,727,078 | Shoemaker | Dec. 13, 1955 |
| 2,762,751 | Slaughter et al. | Sept. 11, 1956 |

OTHER REFERENCES

Berry et al.: Jour. Amer. Chem. Soc., vol. 49, December 1927, pp. 3142–3149.

Norris et al.: Jour. Amer. Chem. Soc., vol. 61, May 1939, pp. 1163–1170.